US005397894A

United States Patent [19]

Wells et al.

[11] Patent Number: 5,397,894

[45] Date of Patent: Mar. 14, 1995

[54] METHOD OF HIGH MASS RESOLUTION SCANNING OF AN ION TRAP MASS SPECTROMETER

[75] Inventors: Gregory J. Wells, Fairfield; Edward G. Marquette, Oakland, both of Calif.; Raymond E. March; Frank A. Londry, both of Ontario, Canada

[73] Assignee: Varian Associates, Inc., Palo Alto, Calif.

[21] Appl. No.: 68,453

[22] Filed: May 28, 1993

[51] Int. Cl.[6] ........................ B01D 59/44; H01J 49/00

[52] U.S. Cl. ..................................... 250/282; 250/292

[58] Field of Search ................................ 250/282, 292

[56] References Cited

U.S. PATENT DOCUMENTS

| | | | |
|---|---|---|---|
| 4,540,884 | 9/1985 | Stafford et al. | 250/282 |
| 4,882,484 | 11/1989 | Franzen et al. | 250/282 |
| 5,107,109 | 4/1992 | Stafford et al. | 250/282 |
| 5,134,286 | 7/1992 | Kelley | 250/282 |
| 5,171,991 | 12/1992 | Johnson et al. | 250/282 |
| 5,173,604 | 12/1992 | Kelley | 250/282 |
| 5,182,451 | 1/1993 | Schwartz et al. | 250/282 |
| 5,196,699 | 3/1993 | Kelley | 250/282 |
| 5,198,665 | 3/1993 | Wells | 250/282 |

OTHER PUBLICATIONS

Article by Jae C. Schwartz, et al., entitled "High Resolution on a Quadrupole Ion Trap Mass Spectrometer", published in *American Society for Mass Spectrometry,* 1991, v. 2, pp. 198–204.

Article by Jon D. Williams, et al., entitled "Improved Accuracy of Mass Measurement with a Quadrupole Ion-trap Mass Spectrometer", published in *Rapid Communications in Mass Spectrometry,* 1992, v. 6, pp. 524–527.

Article by S. A. McLuckey, et al., entitled "Enhancement of mass Resolution in the Quadrupole Ion Trap Via Resonance Ejection", published in *Proc. 39th ASMS Conference on Mass Spectrometry and Allied Topics,* Nashville, Tenn., 1991, pp. 532–533.

*Primary Examiner*—Bruce C. Anderson

*Attorney, Agent, or Firm*—David Schnapf; Edward H. Berkowitz

[57] ABSTRACT

A method of using a quadrupole ion trap mass spectrometer for high resolution mass spectroscopy is disclosed. High resolution of a mass spectrum of a desired species is achieved by first using a slow scanning rate and by first ridding the trap of unwanted ions. Accurate mass calibration is achieved by using a reference compound of known mass and using a second supplemental AC dipole voltage to eject the reference ions at nearly the same time as the sample ions of interest are ejected from the trap. This eliminates the need to scan the trap between the masses of the sample and reference ions. Space charge in the trap is held constant, thereby eliminating a major source of mass axis instability, by using the results of one scan to control the ionization time during the next scan. Preferably, during ionization a broadband supplemental dipole voltage is applied to the ion trap to rid it of unwanted ions. During a portion of the ionization time the broadband signal is constructed to retain only sample ions in the ion trap, and during the remainder of the ionization time the broadband signal is constructed to retain both sample and reference ions in the ion trap. By adjusting the relative lengths of the two portions of the ionization time the total space charge in the ion trap can be held constant notwithstanding variations in sample ion concentration.

17 Claims, 6 Drawing Sheets

METHOD OF HIGH MASS RESOLUTION SCANNING OF AN ION TRAP MASS SPECTROMETER

The present invention relates to the field of mass spectrometry, and is particularly related to methods for obtaining very high mass resolution from a three-dimensional quadrupole ion trap mass spectrometer.

BACKGROUND OF THE INVENTION

A number of different types of mass spectrometers are known to those skilled in the art, each having its own set of advantages and disadvantages. The present invention relates to methods of using the three-dimensional quadrupole ion trap mass spectrometer ("ion trap") which was initially patented in 1960 by Paul, et al. In recent years the ion trap mass spectrometer has grown in popularity in part due to its relatively low cost, ease of manufacture, and its unique ability to store ions over a large range of masses for relatively long periods of time. Nonetheless, the most common methods presently employed for using the ion trap do not yield very high mass resolution.

The quadrupole ion trap comprises a ring-shaped electrode and two end cap electrodes. Ideally, both the ring electrode and the end cap electrodes have hyperbolic surfaces that are coaxially aligned and symmetrically spaced. By placing a combination of AC and DC voltages (conventionally designated "V" and "U", respectively) on these electrodes, a quadrupole trapping field is created. This may be simply done by applying a fixed frequency (conventionally designated "f") AC voltage between the ring electrode and the end caps to create a quadrupole trapping field. The use of an additional DC voltage is optional, and in commercial embodiments of the ion trap no DC voltage is normally used. It can be shown that by using an AC voltage of proper frequency and amplitude, a wide range of masses can be simultaneously trapped.

The mathematics of the quadrupole trapping field created by the ion trap are well known and were described in the original Paul, et al., patent. For a trap having a ring electrode of a given radius equatorial $r_0$, end caps displaced from the origin at the center of the trap along the axial line $r=0$ by a distance $z_0$, and for given values of U, V and f, whether an ion of mass-to-charge ratio (m/e, also frequently designated m/z) will be trapped depends on the solution to the following two equations:

$$a_z = \frac{-16eU}{m(r_0^2 + 2z_0^2)\Omega^2} \quad \text{Eq. 1}$$

$$q_z = \frac{+8eV}{m(r_0^2 + 2z_0^2)\Omega^2} \quad \text{Eq. 2}$$

Where $\Omega$ is equal to $2\pi f$.

Solving these equations yields values of $a_z$ and $q_z$ for a given ion species having the selected m/e. If the point $(a_z,q_z)$ maps inside the stability envelop, the ion will be trapped by the quadrupole field. If the point $(a_z,q_z)$ falls outside the stability envelop, the ion 7ill not be trapped and any such ions that are created within the trap will be quickly ejected. By changing the values of U, V or f one can affect the stability of a particular ion species. Note that from Eq. 1, when $U=0$, (i.e., when no DC voltage is applied to the trap), $a_z=0$.

The typical method of using an ion trap consists of applying voltages to the trap electrodes to establish a trapping field which will retain ions over a wide mass range, introducing a sample into the ion trap, ionizing the sample, and then scanning the contents of the trap so that the ions stored in the trap are ejected and detected in order of increasing mass. Typically, ions are ejected through perforations in one of the end cap electrodes and are detected with an electron multiplier.

A number of methods exist for ionizing sample molecules. Most commonly, sample molecules are introduced into the trap and an electron beam is turned on ionizing the sample within the trap volume. This is referred to as electron impact ionization or "EI". Alternatively, ions of a reagent compound can be created within or introduced into the ion trap to cause ionization of the sample. This technique is referred to as chemical ionization or "CI". Other methods of ionizing the sample, such as photoionization using a laser beam, are also known. For purposes of the present invention the specific ionization technique used to create ions is not important.

Once the ions are formed and stored in the trap a number of techniques are available for isolating specific ions of interest, and for conducting so-called $(MS)^n$ experiments. In $(MS)^n$ experiments an isolated ion or group of ions, called "parent" ions, are fragmented creating "daughter" ions, which may be detected themselves or fragmented to create "granddaughter" ions, etc. Isolation techniques involve manipulating the trapping voltage(s) and/or using supplemental voltages as described below.

No matter what type of experiment is conducted within the ion trap, ultimately there will be a need to determine what ions are present in the trap. As noted above, this generally involves scanning the trap so that ions are ejected and detected. U.S. Pat. No. 4,540,884 describes a technique for scanning one or more of the basic trapping parameters, i.e., U, V or f, to sequentially cause trapped ions to become unstable and leave the trap. Unstable ions tend to leave in the axial direction and can be detected using a number of techniques, for example, as mentioned above, a electron multiplier connected to standard electronic circuitry.

In the preferred method taught by the '884 patent, the DC voltage, U, is set at 0. As noted, from Eq. 1 when $U=0$, then $a_z=0$ for all mass values. As can be seen from Eq. 2, the value of $q_z$ is directly proportional to V and inversely proportional to the mass of the particle. Likewise, the higher the value of V the higher the value of $q_z$. In the preferred embodiment the scanning technique of the '884 patent is implemented by ramping the value of V. As V is increased positively, the value of $q_z$ for a particular mass to charge ratio increases to the point where it passes from a region of stability to one of instability. Consequently, the trajectories of ions of increasing mass to charge ratio become unstable sequentially, and are detected when they exit the ion trap.

According to another known method of scanning the contents of an ion trap, a supplemental AC voltage is applied across the end caps of the trap to create an oscillating dipole field supplemental to the quadrupole field. In this method, the supplemental AC voltage has a different frequency than the primary AC voltage V. The supplemental AC voltage can cause trapped ions of specific mass to resonate at their so-called "secular" frequency in the axial direction. When the secular frequency of an ion equals the frequency of the supplemental voltage, energy is efficiently absorbed by the ion. When enough energy is coupled into the ions of a specific mass in this manner, those ions are ejected from the trap in the axial direction and subsequently detected. The technique of using a supplemental dipole field to excite specific ion masses is called axial modulation. Furthermore, axial modulation can be used to eject unwanted ions from the trap, and in connection with $(MS)^n$ experiments to cause ions in the trap to collide with a buffer gas and fragment.

The secular frequency of an ion of a particular mass in an ion trap depends on the magnitude of the fundamental trapping voltage V. Thus, there are two ways of bringing ions of differing masses into resonance with the supplemental AC voltage. One can ramp the frequency of the supplemental voltage in a fixed trapping field, or one can vary the magnitude V of the trapping field while holding the frequency of the supplemental voltage constant. Typically, when using axial modulation to scan an ion trap, the frequency of the supplemental AC voltage is held constant and V is ramped so that ions of successively higher mass are ejected. The advantage of ramping the value of V is that it is relatively simple to perform and provides better linearity than can be attained by changing the frequency of the supplemental voltage. This method of scanning the trap is herein called resonance ejection scanning.

Resonance ejection scanning of trapped ions provides better sensitivity than can be attained using the mass instability technique taught by the '884 patent and produces narrower, better defined peaks. In other words, this technique produces better overall mass resolution. Resonance ejection also substantially increases the ability to analyze ions over a greater mass range.

In commercial embodiments of the ion trap using resonance ejection as a scanning technique, the frequency of the supplemental AC voltage is set at approximately one half of the frequency of the AC trapping voltage. It can be shown that the relationship of the frequency of the trapping voltage and the supplemental voltage determines the value of $q_z$ (as defined in Eq. 2 above) of ions that are at resonance. Indeed, sometimes the supplemental voltage is characterized in terms of the value of $q_z$ at which it operates.

A significant limiting factor in achieving very high mass resolution from the ion trap is in the rate at which the contents of the trap are scanned. Typically, commercial ion traps are designed to scan at a fixed rate of 5555 atomic mass units (amu's) per second; (stated equivalently, this is a scan rate of 190 μs per amu).

Commercially, almost all ion traps are sold in connection with gas chromatographs (GC's) which serve, essentially, as input filters to the ion traps. However, the flow from a GC is continuous, and a modern high resolution GC produces narrow peaks, sometimes lasting only a matter of seconds. In order to detect narrow peaks, it is necessary to perform at least one complete scan of the ion trap per second. This, in turn, dictates the use of a fast scan rate in order to cover a wide range of masses.

In this context, mass resolutions of approximately 2,000 were typically all that could be achieved using resonance ejection as described above. Recently several experiments have been reported wherein significant improvements to this mass resolution have been achieved. However, the techniques used in these experiments all have significant shortcomings.

Initially, mass resolution was improved by simply slowing the scan rate by a factor of 100, such that the time required to scan one amu was increased to approximately 18 ms. This was shown to improve mass resolution to 33,000, at mass 502.

Another experiment to improve mass resolution involved scanning the frequency of the supplemental dipole voltage rather than the magnitude of the trapping voltage. However, this is difficult to do over a large range of masses, and requires more complex electronics. Nonetheless, one experiment using this technique has obtained mass resolution in excess of 45,000 at m/z 502.

Yet another improvement in mass resolution was shown when the scan rate was slowed even further, by a factor of 333 (which was realized by a 2000 fold attenuation in the rate in connection with a six-fold extension of the mass range). In this experiment, a mass resolution of 1,130,000 was achieved for CsI at m/z 3510. The FWHM (full width at half maximum) of the resulting peak was 3.5 mamu. In referring to high mass resolution spectroscopy it is generally more informative to quote the peak width at half height (i.e., FWHM) rather than the resolution itself.

While some of these improvements have been quite dramatic, there are several problems associated with them. In many circumstances a very slow scan rate is impractical due to the need to scan a wide range of masses in a relatively short time slow scanning is relatively high in noise, however, when using slow scanning it is difficult to utilize the traditional approach to improving signal-to-noise ratio by averaging the results of several scans. In particular, instabilities in the mass axis over time causes the location of the mass peaks to drift over time, and the longer the time between scans the greater the problem. It is generally believed that this problem is attributable to instabilities in the electronics of the ion trap, principally the RF electronics. Moreover, space charge differences in the ion trap from one experiment to the next, or over the course of a single experiment, can contribute to mass axis instability.

As mass resolution increases, the accuracy of the mass determination becomes a more difficult problem. While it may be possible, using the above described techniques, to obtain a very narrow mass peak, determining the exact mass number of the highly resolved peak is a wholly different and quite difficult problem. One approach that has been used to solve this has been to introduce an internal standard, for calibration purposes, of a reference compound of known mass, for example, CsI. One reported experiment describes a method whereby CsI atoms are introduced from outside the trap using a solid probe. This method, however, has not been shown to be effective when using very high resolution techniques, e.g., when mass resolutions greater than 50,000 are involved. Moreover, in many instances, the reference ion will not be close in mass to sample ions of interest. In such instances, the relatively long time needed to scan the ion trap between the calibration mass and the sample ions of interest, in connection with the aforementioned mass axis instabilities, precludes this from being a useful technique for very high mass resolution. For example, if the sample ion has a mass-to-charge ratio of 414 and the reference ion has a mass-to-charge ratio of 502 it would take approximately 18 seconds to scan between them at a scan rate of 5 amu/sec. While, in theory, it may be possible to try to select a calibration mass which is close in mass to the ion(s) of interest, so that the scanning time between them is minimized, this does not appear to be a practical solution.

In addition, as with most any instrument of its type, it is known that the dynamic range of an ion trap is limited, and that the most accurate and useful results are attained when the trap is filled with the optimal number of ions. If the too few ions are present in the trap, sensitivity is low and peaks may be overwhelmed by noise. If too many ions are present in the trap, space charge effects can significantly distort the trapping field, and peak resolution can suffer. The prior art has addressed this problem by using a so-called automatic gain control (AGC) technique whereby the total charge in the trap is integrated and held at a constant level. The AGC technique of the prior art does not distinguish how the total charge in the trap is distributed among the various masses, so that it does not determine whether the total integrated charge is distributed equally among all masses or if it resides at a single mass. In particular, the prior art AGC technique uses a fast "prescan" of the contents of the trap to integrate the charge present in the trap over the total mass range. While this approach is acceptable for normal low mass resolution scanning, at high resolution, it is extremely important to control the amount of charge due to ions having mass-to-charge ratios in the vicinity of a particular mass which is scanned at very high resolution.

SUMMARY OF THE INVENTION

Accordingly, it is an object of the present invention to provide a technique for using an ion trap to provide very high mass resolution.

Another object of the present invention is to provide a method of using an ion trap for high resolution which compensates for mass axis instabilities, thereby allowing improvements to the signal-to-noise ratio.

Yet another aspect of the present invention is to overcome mass axis instabilities which prevent the use of a calibration ion in achieving very high mass accuracy.

A further object of the present invention is to allow sample and reference ions to be detected within a closely spaced time interval while using a slow scanning rate.

Still another object of the present invention is to provide a method of controlling the dynamic range of the ion trap for a selected ion species so that very high mass resolution may be achieved.

These and other objects of the present invention which will be apparent to those of ordinary skill in the art upon reading the present specification in conjunction with the accompanying drawings and the appended claims, are realized in the present method for operating a quadrupole ion trap mass spectrometer. In one aspect, the present invention involves manipulating the trapping parameters to store sample ions of interest and reference ions, which need not be similar in mass to the sample ions, and applying two supplemental dipole voltages to the end cap electrodes, the frequencies of the dipole voltages being selected such that when the amplitude of the trapping voltage is scanned, the reference ions and the sample ions are ejected from the trap over a short time interval, preferably well less than one second. Preferably, the ions of higher mass-to-charge ratio, whether they be the sample ions or the reference ions, are ejected from the trap first, followed shortly thereafter by the ions of lower mass-to-charge ratio. In a further aspect, the trap is purged of all ions other than the sample and reference ions. In another aspect of the invention, a constant space charge condition of sample and reference ions is maintained by adjusting the ionization time based on the previous scan.

DETAILED DESCRIPTION

The present invention is directed to improving the mass resolution, signal-to-noise ratio and mass calibration accuracy of commercial quadrupole ion trap mass spectrometers so that they can be used for high mass resolution scanning. The quadrupole ion trap mass spectrometer (referred to herein as the "ion trap") is a well-known device which is both commercially and scientifically important. The general means of operation of the ion trap has been discussed above and need not be described in further detail as it is a well-established scientific tool which has been the subject of extensive literature.

It is also now well-established that one can improve the mass resolution of the ion trap by slowing the scanning speed. Commercial embodiments of the ion trap scan the contents of the trap at a rate of 5555 amu/sec. However, as discussed above, certain other problems arise when the scanning rate is slowed. The present invention is directed, in part, to overcoming some of those problems. Moreover, high mass resolution /f scanned peaks does not solve the problem of accurate mass assignment. Accurate mass assignment is affected by many factors, one of which can be the space charge in the ion trap which acts as a DC offset in the trapping field and, if not held constant, changes the position of the mass peak from one experiment to another.

(It is noted that it is common in the field to speak in abbreviated fashion in terms of the "mass" of ions, although it would be more precise to speak of the mass-to-charge ratio of ions, which is what is really being measured. For convenience, this specification adopts the common practice, and frequently uses the term "mass" to mean mass-to-charge ratio.)

Figure 1:
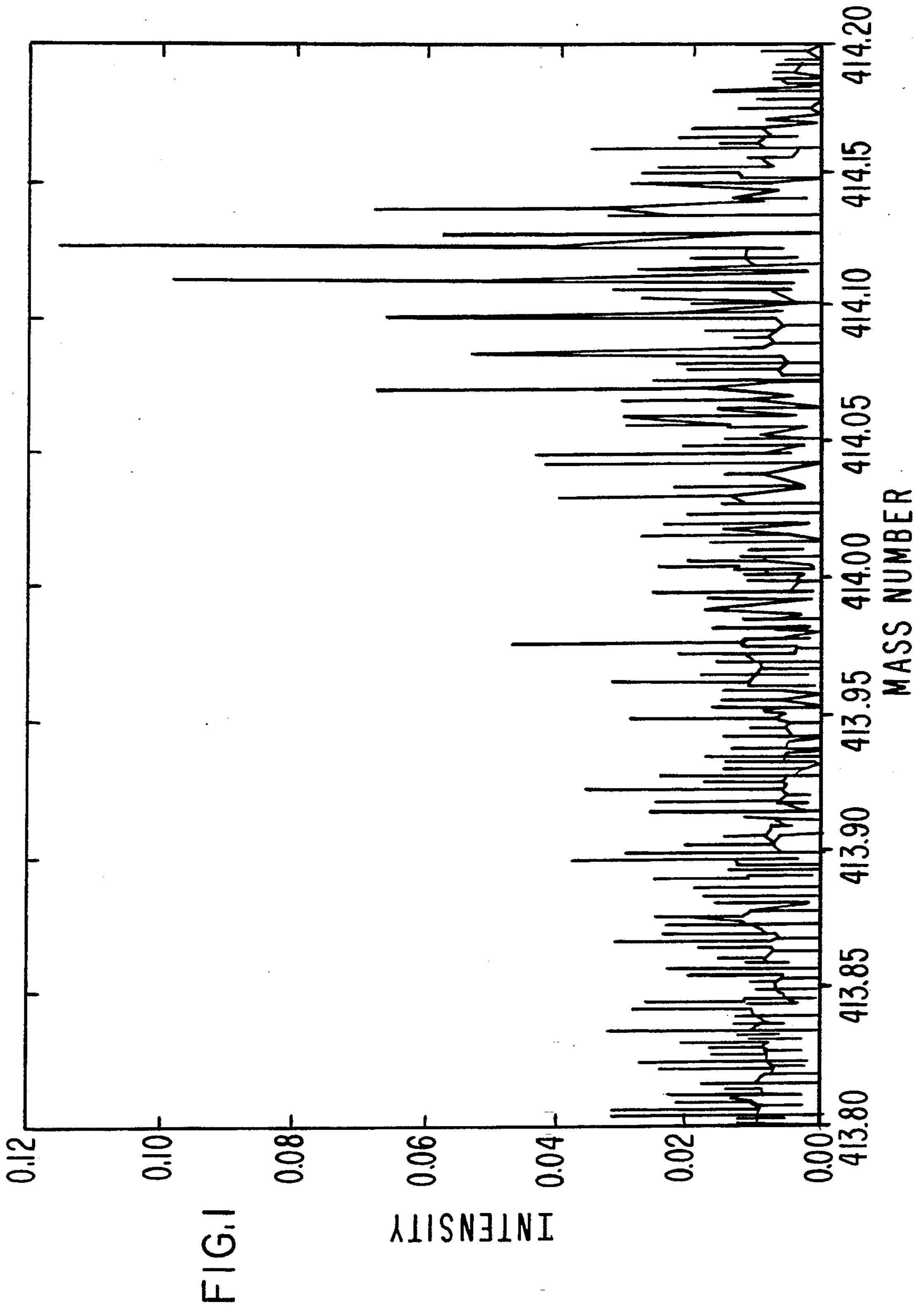
FIG. 1 is a mass spectrum of the contents of an ion trap containing a sample of PFTBA taken under normal operating conditions using a slow scan rate.

FIG. 1 is a portion of a mass spectrum of the contents of an ion trap containing only the sample PFTBA (perflurotributylamine). This compound is often used as a mass calibration standard due to the presence of ions at masses 69, 100, 131, 212, 264, 414, 502 and 614. In particular, FIG. 1 shows the mass spectrum between mass numbers 413.80 and 414.20. The mass spectrum was obtained in accordance with the resonance ejection scanning technique that is well-known in the prior art, however using a scan rate of 5 amu/sec., which is slower than that typically used in the prior art, (i.e., 55.5 amu/sec for this mass range). In the resonance ejection technique employed, a supplemental AC dipole voltage is applied to the ion trap and is used to resonate out of the trap ions whose secular frequency equals the frequency of the supplemental voltage. As explained above, by scanning the amplitude of the primary trapping voltage the trapped ions are sequentially scanned out of the trap.

An examination of FIG. 1 shows no single discernable peak over the mass range depicted where mass 414 should have been found. Thus, the when the trap is filled with ions over a large mass range, they all contribute to the overall space charge within the ion trap. When the ion trap is scanned at higher rates, such as the typical fast scan rate for this mass range of 55.5 amu/sec or greater, the space charge distribution among the masses has no significant effect. However, when the trap is scanned at an extremely slow scan rate, the distributed space charge prevents all of the ions of a particular mass (in this case mass 414.0) from being ejected together in a short time interval. Instead, the effect of the space charge is to cause the ions of the same mass to be ejected over a broad range of field conditions, and thus mass intensity and resolution are lost.

Figure 2:
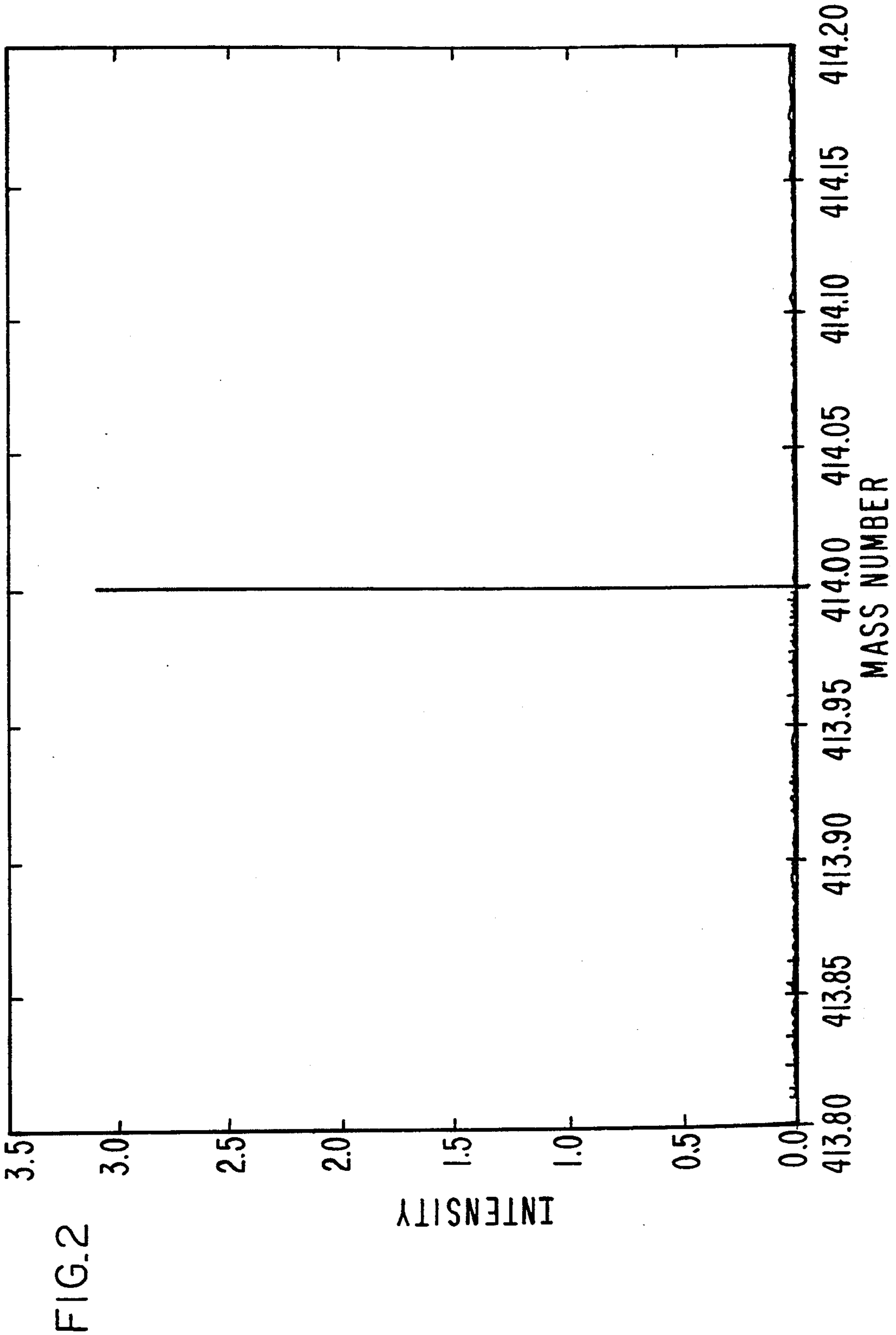
FIG. 2 is a mass spectrum of the contents of an ion trap containing the same sample as in FIG. 1, after first eliminating unwanted higher mass ions from the trap in accordance with the present invention.
Figure 3:
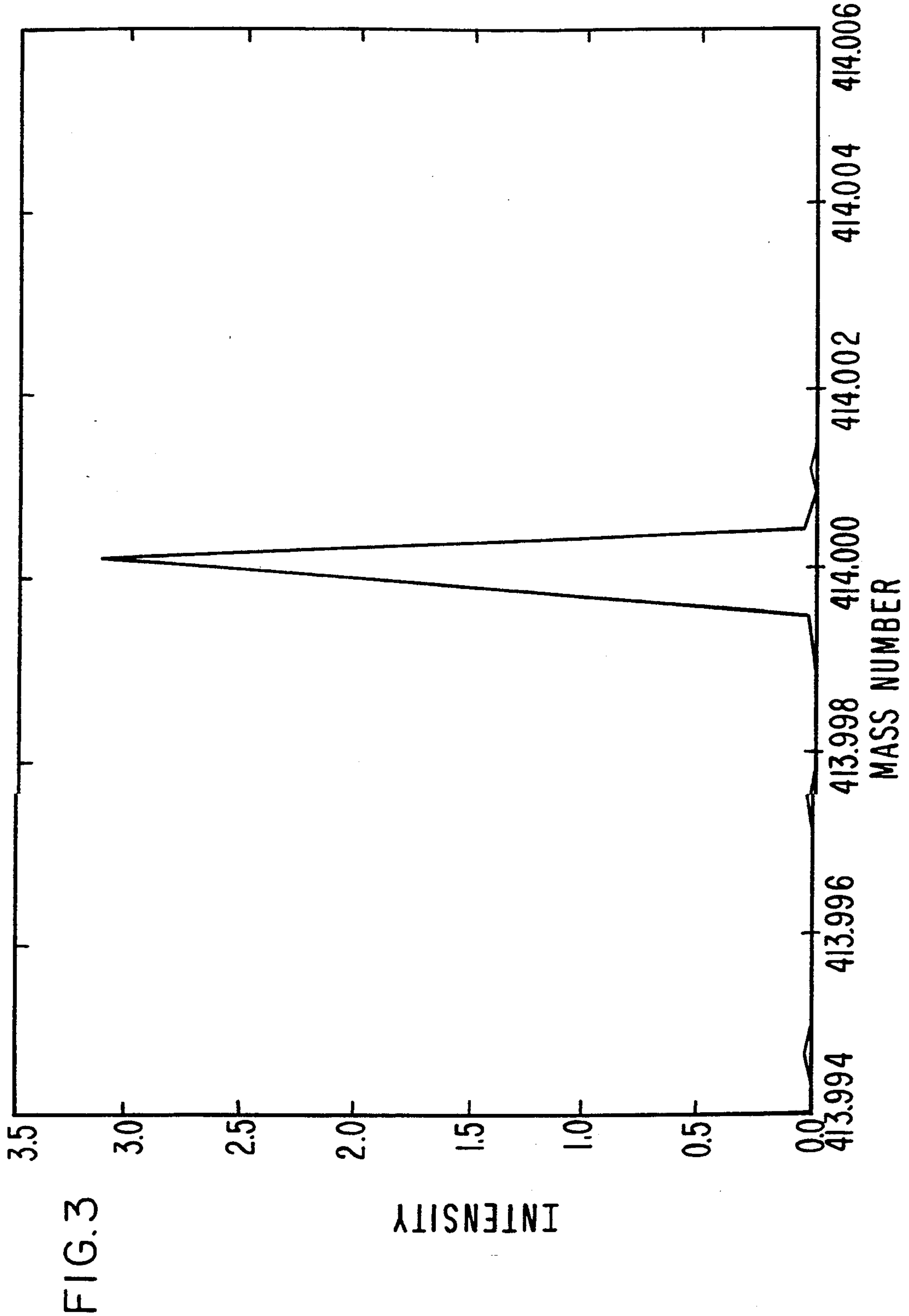
FIG. 3 is an expanded view of a portion of the mass spectrum of FIG. 2.

FIG. 2 shows a mass spectrum obtained in an experiment which was, in all material respects, identical to the experiment depicted in FIG. 1, except that mass 414 was first mass isolated in the trap prior to scanning. (Note that the abscissa of FIG. 2 is the same as that in FIG. 1, but that the intensity scales differ substantially.) FIG. 3 is an exploded view of a portion of the mass spectrum of FIG. 2 to show the finite width of the mass 414 peak, thereby showing the mass resolution obtained. It can be seen that the elimination of unwanted ions has a profound effect on the height and resolution of the peak.

Methods for isolating individual ions, or a group of ions in a narrow mass range, are well known to those skilled in the art. One useful technique for accomplishing this result is disclosed in U.S. Pat. No. 5,300,772 filed Jul. 31, 1992, coassigned herewith, the disclosure of which is incorporated by reference. In summary, the method taught in the referenced application involves creating a composite supplemental dipole waveform containing all the frequency components needed to resonantly eject unwanted ions from the ion trap, while lacking the frequency components which would resonantly eject the ions of interest so that these are retained.

The preferred embodiment of the present invention involves repetitively scanning the trap, as is common in the art. In each scan, a narrow mass range or ranges, covering the masses of sample ions of interest (and, optionally, as described below, references ions) are isolated in the ion trap as described above. When the contents of the ion trap are then detected, the total charge in the trap, attributable only to the retained ion species of interest, is integrated. The integrated mass from one scan is then use to adjust the ionization time of the succeeding scan, such that the net charge in the trap, after ejection of unwanted ions, may be held at an optimum constant level. This is in contrast to prior art AGC techniques which merely adjusted the total charge in the trap by integrating the total charge of all species in the ion trap in a "prescan" step. It can be seen that the prior art technique makes no effort to take into account the distribution of masses and, therefore, is not useful when working with isolated masses. In high resolution scanning, it is extremely important that the amount of charge due to ions having mass-to-charge ratios significantly different from the particular mass of interest, be controlled or eliminated.

While reducing the scan rate of the ion trap is an effective way to improve mass resolution, the time it takes to scan between masses that are significantly different presents practical problems. Due to RF instabilities and other factors (such as space charge) which affect the ability to make accurate mass determinations, experimenters sometimes utilize reference compounds of known mass for calibration purposes. However, if the reference compound has a mass which is significantly different than the mass of the sample, the time it takes to scan between the two masses becomes significant. Not only does this present practical problems in terms of the length of an experiment, but during the extended time period the system electronics may drift causing mass axis instabilities. Moreover, the contents of the trap may change over extended time periods due to the presence of background gases, collisional fragmentation, etc. These changes may, in turn, affect the space charge within the trap further affecting mass axis stability.

The present invention overcomes this problem by using two supplemental AC dipole voltages to independently eject the sample and reference ions from the ion trap, so that they can be ejected at nearly the same time. By using two precisely determined supplemental frequencies it is possible to independently control when the sample ions of interest and the reference ions will be ejected, so that any desired time interval between these two events can be used. Preferably, the time interval between the ejection of the two ion species is quite short, i.e., significantly less than one second apart, and preferably is only a few hundredths of a second apart. The only limitation on the temporal spacing of the two ejections is the need to allow enough time so that the individual peaks are adequately resolved, including room for any uncertainty as to the precise mass of the sample ions. When using the slow scanning method, peak width translates to only a few milliseconds. This technique eliminates the need to scan the trap over the entire range of masses from the sample to the reference.

Figure 4A:
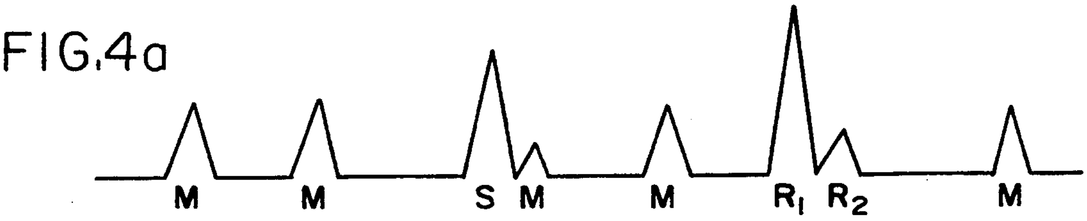
FIGS. 4A–4D are simplified representations of mass spectra used for illustrative purposes.
Figure 4B:
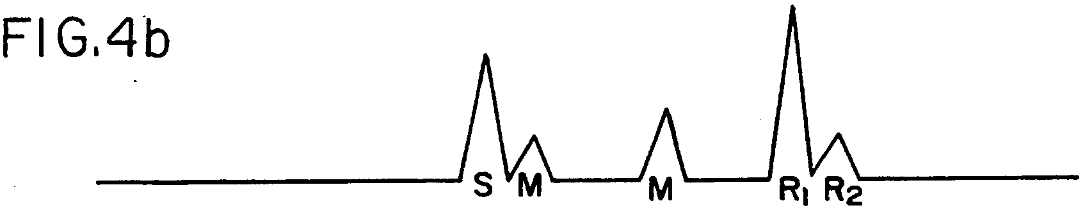
Figure 4C:
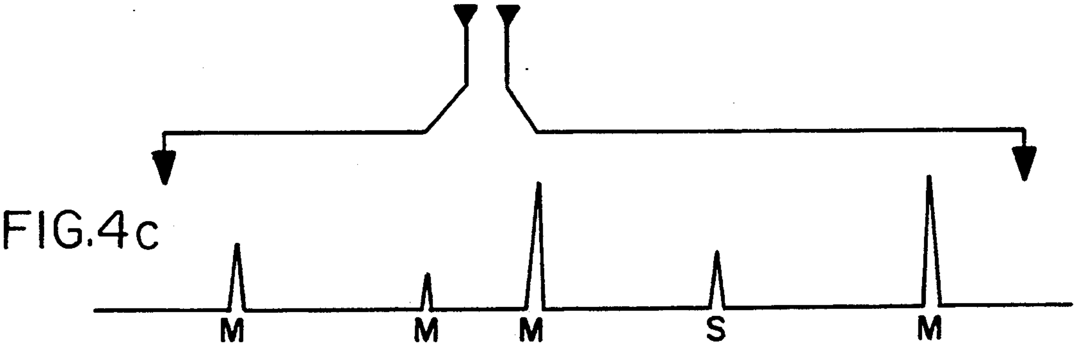

FIG. 4A illustrates a mass spectrum taken under normal low resolution conditions (i.e., using a normal fast scan rate), including a nominal sample ion "S", a reference ion "$R_1$" and its isotope "$R_2$", and several matrix ions "M". FIG. 4B illustrates the resulting spectrum after isolating the sample and reference ions. In the depiction of FIG. 4B all the ions in the mass range between the sample ion and the reference ion are retained in the ion trap. Alternatively, and preferably, the ions between the nominal sample ion mass and the reference mass are also eliminated from the ion trap, as by resonant ejection. FIG. 4C illustrates a high resolution scan (i.e., using a slow scan rate) of mass spectrum in the vicinity of the nominal sample ion. It is seen that the sample is resolved into a true sample ion and several additional matrix ions. If the scan were to proceed from the nominal sample ion to the reference ion, the reference ion would not be scanned out for a very long time. As described in background portion of this specification, it would take, for example, 18 seconds to scan from mass 414 to mass 502 at a scan rate of 5 amu/sec.

According to the present invention a first supplemental AC dipole voltage is applied to the trap which is calculated to cause sample ions in a narrowly selected mass range to be ejected from the ion trap at a selected first value of $q_z$. From this information, and knowing the precise mass number of the reference ion, it is relatively straightforward to calculate the value of a second supplemental frequency that will cause the reference ion to be ejected at a point in time which is offset from the ejection time of the sample ion by less than a second as the primary trapping voltage is ramped up in accordance with the normal slow scanning technique. Typically, an ion trap uses a digital-to-analog converter (DAC) to control and ramp the magnitude of the AC trapping voltage to scan the ion trap. The slower scan rate may be achieved by increasing the number of DAC steps per mass unit and also increasing the dwell time for each DAC step.

Figure 4D:
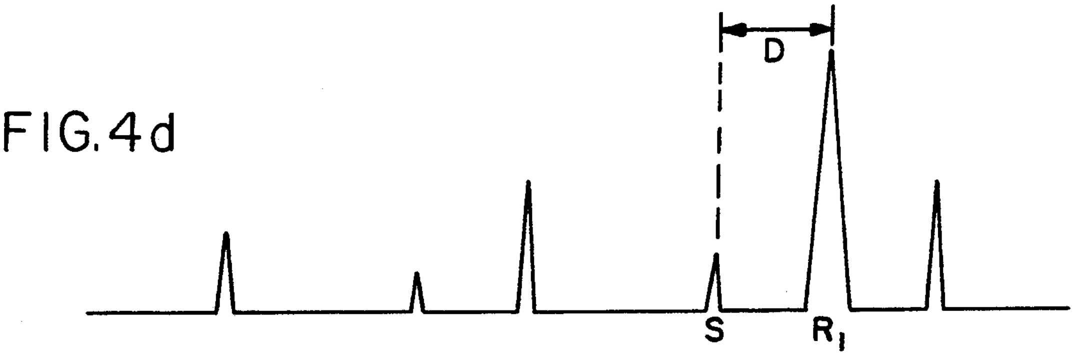

FIG. 4D shows a slow scan of ion trap content using the dual supplemental AC voltages of the present invention. It will be seen that the first frequency causes a mass spectrum which is essentially identical to what is illustrated in FIG. 4C. Superimposed on this mass spectrum is the mass spectrum caused by the presence of the second supplemental AC dipole voltage which is used to eject the reference ion at peak "$R_1$". As discussed, the respective first and second supplemental voltages are selected such that peak "S" and peak "$R_1$" are closely spaced.

It has been determined that the accuracy of this technique is substantially improved when higher mass ions are scanned out of the trap before the lower mass ions. In this regard, it does not matter whether the higher mass ions are the sample ions or the reference ions. While the reasons for this are not fully understood, it is believed that the importance of the scanning order stems from how ions distribute themselves within the ion trap. In particular, it appears that lower mass ions tend to occupy positions in the ion trap which are closer to the center of the ion trap than higher mass ions, which tend to remain further from the ion trap center. In effect, the ions of different mass occupy different "layers" or "shells" within the trapping volume. It is believed that the improved results from first scanning higher and then lower masses is related to the way in which these layers are removed. It is well known that the pseudo-potential well depth, which is the source of the trapping potential, is inversely related to mass. Thus, larger masses, with their smaller potential well depth, would, on average, be expected to be found further from the center of the ion trap.

Figure 5A:
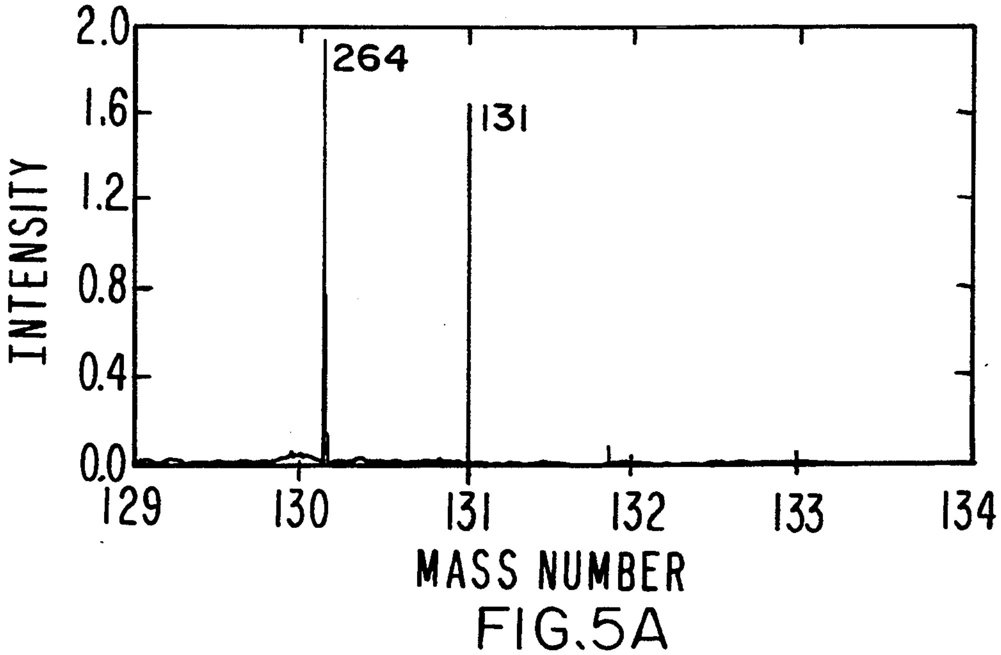
FIGS. 5A–5D are mass spectra obtained using the method of the present invention, showing the effects of the order of mass scanning of ions out of the ion trap.
Figure 5B:
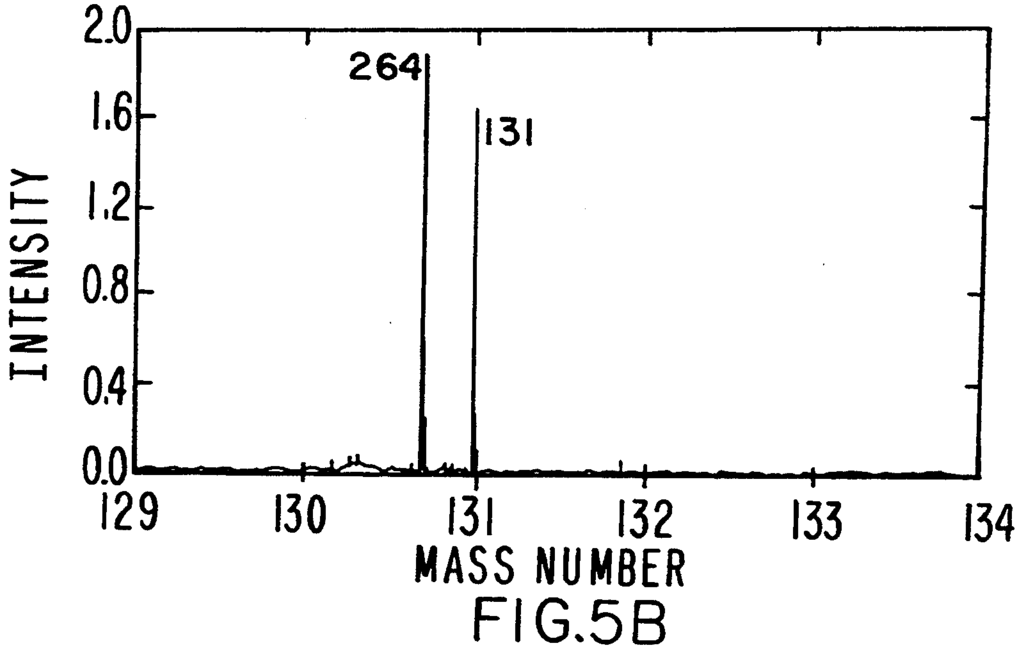
Figure 5C:
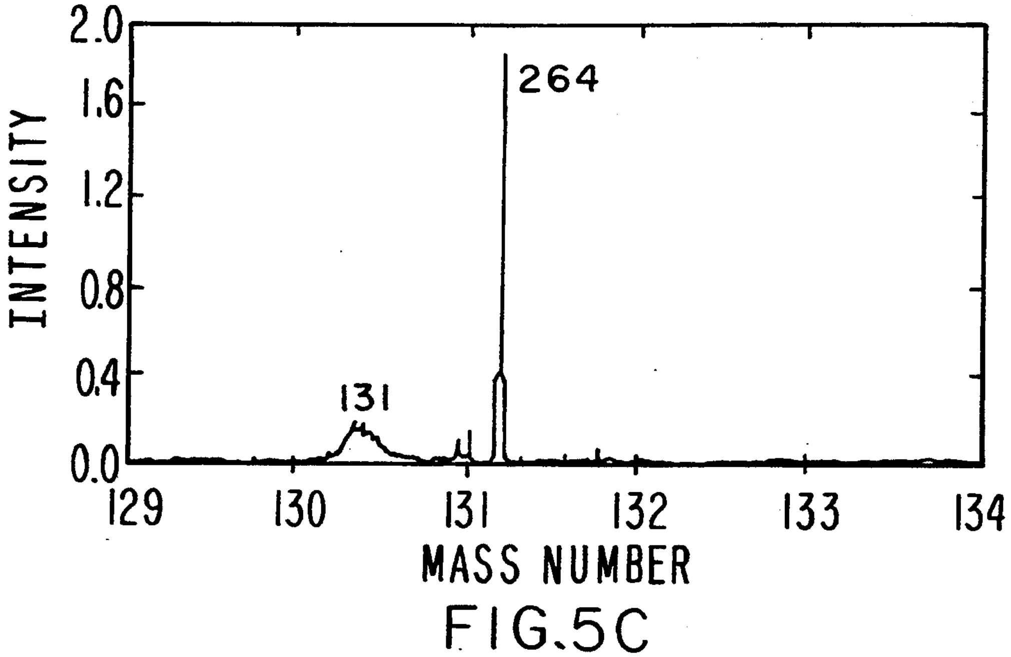
Figure 5D:
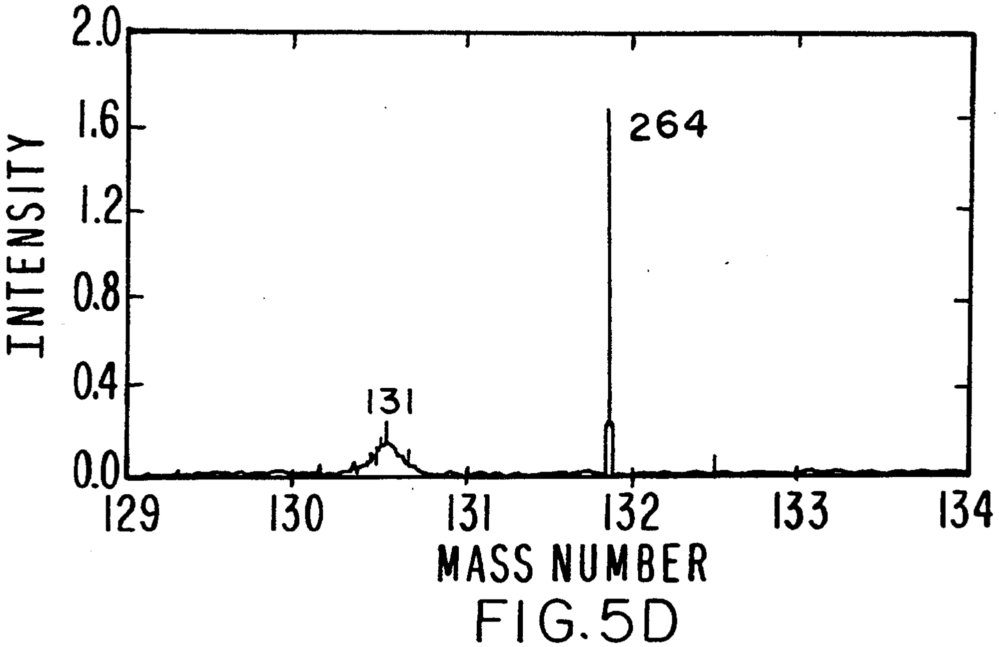

FIGS. 5A–5D show the improvement in resolution which is obtained by scanning higher mass ions out of the ion trap before the lower mass ions. FIG. 5A shows the ejection of mass 264 (at frequency 163.5 kHz) followed by the ejection of mass 131. It can be seen that the resolution of this mass spectra is quite good. FIG. 5B shows the same experiment, however, the ejection frequency for mass 264 has been changed to 164.5 kHz, so that mass 131 is ejected closer in time to mass 264. Again, good resolution is obtained. In FIGS. 5C and 5D the ejection frequency of mass 264 has been changed to 165.5 and 166.6 kHz, respectively, so that, in both instances, mass 264 is ejected after mass 131. In the spectra of FIGS. 5C and 5D, the resolution of mass 131 is clearly degraded.

Although, in the preferred embodiment, higher mass ions are scanned out of the ion trap first, many of the advantages of the present invention will be realized when the present invention is used in connection with the prior art method of scanning from low to high mass.

When using the calibration technique of the present invention, it is easy to control the quantity of reference ions that are introduced into the ion trap, but more difficult to control the quantity of sample ions that are introduced. However, as described above, optimal mass resolution is greatly enhanced when the total quantity of sample ions in the trap is held at a constant, optimal level. In another aspect of the present invention, the ionization times of the sample and reference compounds are individually controlled to hold the number of sample ions at a constant level. This is accomplished by first ionizing the contents of the trap for a variable time period $t_1$. During this first ionization step, the sample ions are isolated in the trap by the application of a broadband supplemental voltage, as described above, and in the aforementioned U.S. Pat. No. 5,300,772 Ser. No. 07/923,093, such that only sample ions are retained in the ion trap, i.e., the broadband supplemental voltage causes all other ions that are formed to be ejected from the ion trap. Thereafter, a second ionization step is performed for a time period $t_2$. During this second ionization step, a supplemental broadband voltage is again applied to the ion trap to eliminate unwanted ions. However, in this instance, the supplemental voltage is tailored to allow both sample ions and reference ions to be retained in the ion trap. Although, in the preferred embodiment, the supplemental broadband ejection voltages are applied during the ionization step, those skilled in the art will recognize that the ejection of unwanted ions could occur after each ionization step.

If the concentration of reference material is given as $C_r$, and is held constant, the amount of charge in the ion trap attributable to the reference ions will be $Q_r=k_rC_r(t_2)$, where $k_r$ is a constant related to the ionization rate of the reference material. Note that $k_r$ is readily determinable. Likewise, the amount of charge in the trap attributable to the sample ions will be $Q_s=k_sC_s(t_1+t_2)$, where $C_s$ is the concentration of the sample, and $k_s$ is a determinable constant related to the ionization rate of the sample. Thus, as the concentration of the sample varies, $t_1$ can be varied so as to keep the total charge $(Q_r+Q_s)$ constant. In this way, the space charge conditions for the sample ions can be held constant over large concentration changes, even in the presence of a fixed concentration of reference ions that are used to fix the mass location on the mass axis.

When using the technique of the present invention to eliminate mass axis instabilities between successive scans of the ion trap, standard methods for improving the signal-to-noise ratio of the mass spectrum by averaging successive scans may be used effectively. Nonetheless, since the technique of the present invention ensures that the ion trap contains the optimal number of ions of interest only, a single mass scan will provide the maximum sensitivity and the need to average scans to improve signal-to-noise ratio is greatly reduced. Since the signal-to-noise ratio increases as the square root of the number of scans, which increases linearly with time, averaging scans results in a signal-to-noise ratio that improves proportionally to the square root of time. On the other hand, signal-to-noise improves linearly with ionization time. Therefore, optimizing ionization time is a more significant factor in improving the signal-to-noise ratio.

While the present invention has been described in connection with the preferred embodiments thereof, those skilled in the art will recognize that other variations and equivalents to the subject matter described. Therefore, it is intended that the scope of the invention be limited only by the appended claims.

What is claimed is:

1. A method of using a quadrupole ion trap mass spectrometer comprising the steps of:

(a) establishing a trapping field within the ion trap such that ions in a range of interest are stably held within the ion trap;
(b) introducing a sample compound into the ion trap;
(c) introducing a reference compound into the ion trap;
(d) ionizing the sample compound and the reference compound, such that sample ions and reference ions are trapped within the ion trap;
(e) applying first and second supplemental AC dipole voltages concurrently to the ion trap, and
(f) scanning the ion trap such that the reference ions are resonantly ejected from the ion trap by said first supplemental AC dipole voltage and the sample ions are resonantly ejected from the ion trap by said second supplemental AC dipole voltage.

2. The method of claim 1 further comprising the step of ejecting unwanted ions from the ion trap prior to step (f) of scanning the ion trap.

3. The method of claim 2 further comprising the step maintaining a desired constant space charge condition of said sample ions and said reference ions.

4. The method of claim 3 wherein steps (a) through (f) of claim 1 are repeated such that first and second scans are performed, and said step of maintaining the desired space charge condition of said sample and reference ions comprises using information from said first scan to adjust the conditions during said second scan.

5. The method of claim 2 wherein a first broadband ejection signal is applied to said ion trap during a first ionization period $t_1$, said first broadband signal having frequency components necessary to eject all but said sample ions from the ion trap, and wherein a second broadband ejection signal is applied to said ion trap during a second ionization period $t_2$, said second broadband signal having frequency components necessary to eject all but said sample ions and said reference ions from the ion trap.

6. The method of claim 18 wherein the relative durations of $t_1$ and $t_2$ are adjusted to maintain a constant space charge within the ion trap notwithstanding variations in the level of sample introduced into the ion trap.

7. The method of claim 1 wherein the ions of higher mass-to-charge ratio are scanned from the trap before the ions of lower mass-to-charge ratio.

8. The method of claim 1 wherein said first and second supplemental AC dipole voltages are selected such that when said ion trap is scanned, the reference ions and the sample ions are ejected within a relatively short time span.

9. The method of claim 1 wherein said reference ions and sample ions are scanned from the trap within a time interval which is less than one second.

10. A method of using an ion trap mass spectrometer comprising the steps of:

(a) establishing a trapping field within the ion trap such that ions in a range of interest are stably held within the ion trap;
(b) introducing a sample matrix into the ion trap and ionizing the sample matrix such that sample ions are trapped within the ion trap;
(c) resonantly ejecting all ions within the trap that do not fall within a selected narrow mass range, thereby eliminating sources of space charge which interfere with high resolution mass analysis;
(d) slowly scanning the ion trap to sequentially eject ions within said selected narrow mass range; and,
(e) detecting the ions ejected from the ion trap.

11. The method of claim 10 further comprising repeating steps (a) through (e) a second time, using the information obtained during the first performance of step (e) to adjust the quantity of ions held within the ion trap after the second performance of step (c), such that the space charge of the ions within said selected narrow mass range is held at a desired level.

12. The method of claim 10 further comprising the step of introducing a reference compound into the ion trap.

13. The method of claim 12 wherein a first broadband ejection signal is applied to said ion trap during a first ionization period $t_1$, said first broadband signal having frequency components necessary to eject all but said sample ions from the ion trap, and wherein a second broadband ejection signal is applied to said ion trap during a second ionization period $t_2$, said second broadband signal having frequency components necessary to eject all but said sample ions and said reference ions from the ion trap.

14. The method of claim 13 wherein the relative durations of $t_1$ and $t_2$ are adjusted to maintain a constant space charge within the ion trap notwithstanding variations in the level of sample introduced into the ion trap.

15. A method of using a quadrupole ion trap mass spectrometer comprising the steps of:

(a) establishing a trapping field within the ion trap such that ions in a range of interest are stably held within the ion trap;
(b) introducing a sample matrix into the ion trap, said sample matrix comprising ions within said range of interest;
(c) introducing a reference compound into the ion trap, said reference compound comprising ions within said range of interest;
(d) ionizing the sample matrix and the reference compound, such that sample ions and reference ions are trapped within the ion trap;
(e) resonantly ejecting all ions from the ion trap that do not fall within any of at least two selected narrow mass ranges, said first selected mass range including the mass of sample ions of interest and said second mass range including the mass of said reference compound, thereby eliminating sources of space charge which interfere with high resolution mass analysis;
(f) scanning the ion trap to eject ions within said selected narrow mass ranges; and,
(g) detecting the ions ejected from the ion trap during step (f).

16. The method of claim 15 wherein the step of scanning the trap comprises applying at least two supplemental AC dipole voltages to the trap, there being /ne supplemental dipole voltage for each selected narrow mass range, whereby sample ions in said first selected narrow mass range are ejected by one of said supplemental AC dipole voltages and reference ions in said second selected narrow mass range are ejected by another of said supplemental AC dipole voltages, such that said first and second mass ranges may be independently scanned.

17. A method of using a quadrupole ion trap mass spectrometer comprising the steps of:

(a) establishing a trapping field within the ion trap such that ions in a range of interest are stably held within the ion trap;

(b) introducing a sample matrix into the ion trap;

(c) introducing a reference compound into the ion trap;

(d) ionizing the sample matrix and the reference compound, such that sample ions and reference ions are trapped within the ion trap; said step of ionizing comprising applying a first broadband ejection signal to said ion trap during a first ionization period $t_1$, said first broadband signal having frequency components necessary to eject all but said sample ions from the ion trap, and thereafter applying a second broadband ejection signal to said ion trap during a second ionization period $t_2$, said second broadband signal having frequency components necessary to eject all but said sample ions and said reference ions from the ion trap, such that all ions in the ion trap fall within two selected narrow mass ranges, said first selected mass range including the mass of sample ions of interest and said second mass range including the mass of said reference compound;

(e) scanning the ion trap to eject ions within said selected narrow mass ranges; and, (f) detecting the ions ejected from the ion trap during step (e).

* * * * *